Oct. 13, 1959
Filed March 1, 1956

R. K. LOCKHART

COMBINED SYNCHRONOUS DEMODULATOR AND BRIGHTNESS SIGNAL CHANNEL 2,908,751
2 Sheets-Sheet 1

INVENTOR.
Robert K. Lockhart
BY
[signature]
ATTORNEY

INVENTOR.
Robert K. Lockhart
BY
[signature]
ATTORNEY

United States Patent Office 2,908,751
Patented Oct. 13, 1959

2,908,751

COMBINED SYNCHRONOUS DEMODULATOR AND BRIGHTNESS SIGNAL CHANNEL

Robert K. Lockhart, Moorestown, N.J., assignor to Radio Corporation of America, a corporation of Delaware Application March 1, 1956, Serial No. 568,927

2 Claims. (Cl. 178—5.4)

The present invention relates to improved circuits for deriving one or more component color signals from a composite color television signal.

The color television signal conforming to standards adapted by the Federal Communications Commission on December 17, 1953, includes a luminance signal and a chrominance signal. The luminance signal is a wideband brightness information signal which conveys the monochrome information in the signal. The luminance signal is designated as the Y signal. The chrominance signal is a modulated subcarrier which contains information relating to a plurality of color difference signals. A color difference signal describes how that color differs from the corresponding color content of the luminance signal. In a color television system employing, for example, red, blue and green component color images, color difference signals of the type R—Y, B—Y and G—Y describe, respectively, how the red, blue and green component colors in the televised image differ from the corresponding red, blue and green content of the luminance signal which describes the brightness of that image.

Color difference signal information may be demodulated from the chrominance signal by synchronous detection, that is, by heterodyning the chrominance signal with a demodulating signal having a phase corresponding to the color difference signal being demodulated. In some types of color television receivers the color difference signals are separately demodulated and then combined with the luminance or Y signal to form the desired trio of component color signals, namely, R, G and B signals. The R, G and B signals are used to drive a color image reproducer employing phosphors having corresponding color light emission.

In color television receivers of the type using the present invention, the composite color television signal is applied to a device termed a color converter. The color converter, unlike a color demodulator which accepts only the chrominance signal and demodulates a color difference signal therefrom, accepts the entire composite color television signal and performs a multiple process of demodulating the desired color difference signal, amplifying the luminance signal and therein combining the luminance signal with the demodulated color difference signal.

In the composite color television signal, red, green and blue color difference signal information is included at different amplitude levels. The color converter and its associated circuits must be capable of providing the correct amount of color difference signal information in combination with the luminance signal so that proper color saturation of that color is achieved.

It is therefore an object of the present invention to provide improved apparatus for making possible the simultaneous demodulation of a color difference signal and the combination of that color difference signal with the luminance signal in a color converter to provide a component color signal having correct color saturation.

According to the present invention, the amplitude level of the signals in the frequency band of the detected composite color television signal, corresponding to the chroma information, is altered to a prescribed level relative to the amplitude level of the signals in the remaining frequency range of the composite signal so that the altered signal when applied to a color converter will yield a component color signal having correct color saturation. In circuits wherein a plurality of component color signals are to be produced, the altering of the amplitude of the signal information in the chrominance signal frequency range of each of a plurality of composite color television signals to different levels prior to the application of one of each of these composite color television signals to one of a plurality of color converters, will cause each component color signal to be developed with proper color saturation by the corresponding color converter.

Other and incidental objects of this invention will become apparent upon a reading of the specification and a study of the drawings, wherein.

Figure 1:
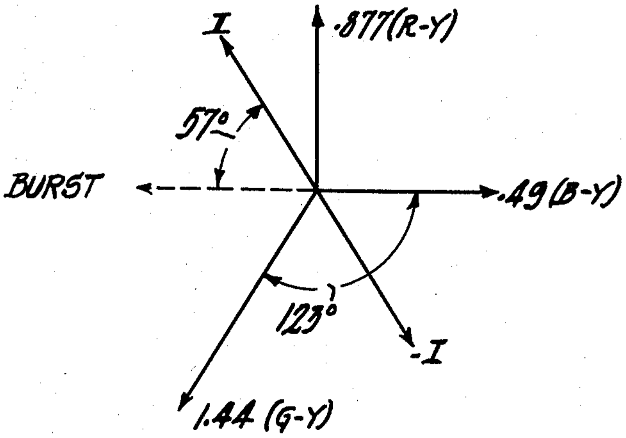
Figure 1 is a vector diagram relating amplitude and phases of selected color difference signals in the chrominance signal.

Figure 1 is a vector diagram relating the phases and amplitudes of the R—Y, B—Y and G—Y color difference signals contained as color information in the chrominance or chroma signal. It is seen from the vector diagram of Figure 1 that the R—Y and B—Y color difference signals are in phase quadrature, with the phase of the G—Y color difference signal lagging the phase of the B—Y color difference signal by 123°. It is further noted from the vector diagram of Figure 1 that R—Y, B—Y and G—Y color difference signal information is contained in the chrominance signal according to amplitude levels having the respective proportions .877:.49:1.44.

In order that the accurately phased demodulating signals for synchronous detection may be generated in an image reproducer circuit remote from the broadcast transmitter, such as a color television receiver, bursts of reference phase information are transmitted on the "back porch" of each horizontal synchronizing pulse during the retrace interval. These bursts, as is seen from the vector diagram of Figure 1, have a phase which leads the phase of the R—Y color difference signal by 90°.

In the chrominance signal, the modulations representative of various color difference signals are included in different bandwidths. The color difference signals such as the R—Y, B—Y and G—Y color difference signals shown in Figure 1 have a band of frequencies from approximately 0 to ½ mc. The frequency band of the chroma relative to each of these color difference signals is therefore in the vicinity of from 3 to 4.2 mcs.; the subcarrier frequency is 3.58 mcs. (the frequency of each burst is also 3.58 mcs.).

The chrominance signal also includes a so-called I signal which is a color difference signal describing color difference signal information along an orange-cyan color axis. The phase of the I signal lags the burst phase by 57°. I signal information has a frequency range from 0 to 1½ mc.; therefore, the chrominance signal, when considered in terms of its I signal modulations, has a frequency band from approximately 2 to 4.2 mcs.; from 2 to 3 mcs., I signal information is included as single sideband information.

Figure 2:
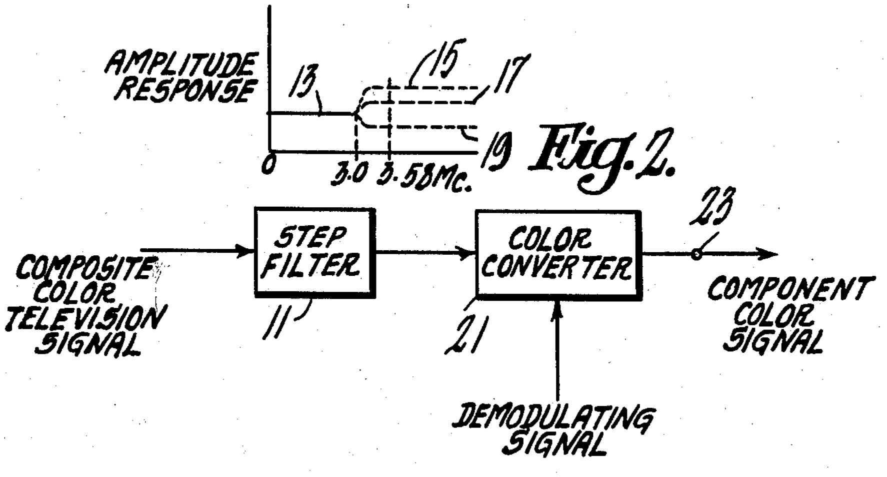
Figure 2 is a block diagram of a step filter and color converter circuit which provides for compensated color saturation of a demodulated component color signal according to the present invention.

Figure 2 is a block diagram of one form of the present invention. The composite color television signal is applied to the step filter 11. The step filter has an amplitude response 13 which, when used for the demodulation of color difference signals having a frequency band from 0 to ½ mc., has a step in the vicinity of 3 mcs. If it is required that the amplitude level in the chrominance signal of a particular color difference signal being demodulated be increased, the amplitude level of the chrominance signal frequency range of the color television signal must be increased or accentuated; the step will therefore take the form of the step 15. For less accentuation of the amplitude level of the chrominance range than that corresponding to step 15, the step will take the form of the step 17. If the color difference signal is of the G—Y variety, that is, a color difference signal constituting information of large amplitude in the chroma, it is desirable that the chrominance signal frequency range in the composite color television signal be de-accentuated or reduced in amplitude level. The step provided by the step filter 11 to accomplish this de-accentuation, will then take the form of the step 19; the output of the step filter 11 will thereupon provide a composite color television signal having a chrominance signal at a lower amplitude level than that level provided to the frequency range from approximately 0 to 3 mcs. of the composite color television signal.

The amplitude-altered composite color television signal provided by the step filter 11 is thereupon applied to the color converter 21 which, responsive to a demodulating signal having a phase corresponding to the particular component color signal to be formed, combines both the luminance signal and a demodulated color difference signal at the output terminal 23. It follows, therefor, use of the present invention provides correct saturation of the component color signal developed at the output terminal 23 in a novel though simple manner.

Figure 3:
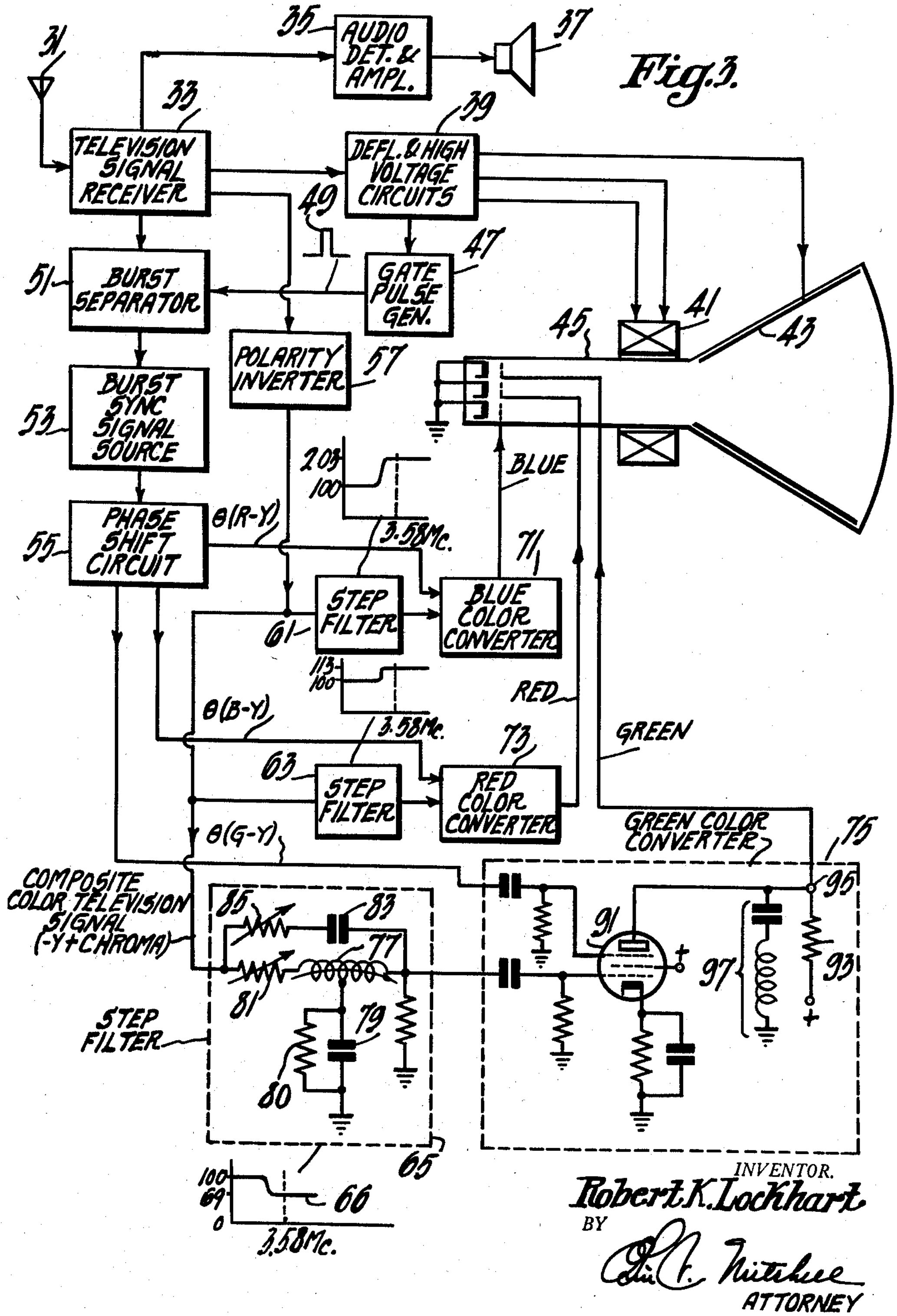
Figure 3 is a diagram of a color television receiver employing the present invention.

Figure 3 is a diagram of a color television receiver using one form of the present invention. A schematic diagram of a step filter 65 and a green color converter 75 are included to illustrate one type of circuit which may be used to accomplish the present invention.

The incoming signal from the broadcast transmitter is received at the antenna 31 and applied to the television signal receiver 33. The television signal receiver detects the composite color television signal from the incoming signal using, for example, a superheterodyne circuit. The detected composite color television signal includes the previously mentioned luminance signal, chrominance signal and color synchronizing bursts and also deflection synchronizing signals and a frequency modulated sound carrier which is transmitted 4½ mcs. removed from the picture carrier.

Using, for example, an intercarrier sound circuit, the audio information is detected from the composite color television signal and amplified in the audio detector and amplifier 35. The amplified audio signal is applied to the loudspeaker 37.

The deflection synchronizing signals are separated from the composite signal in the deflection and high voltage circuits 39 wherein both vertical and horizontal deflection signals are generated in addition to a high voltage. The vertical and horizontal deflection signals are applied to the deflection yokes 41; the high voltage is applied to the ultor 43 of the color kinescope 45.

The deflection and high voltage circuits also energize the gate pulse generator 47 so that during the horizontal retrace interval and more specifically during the duration interval normally occupied by the color synchronizing bursts, a gate pulse 49 is generated. The gate pulse 49 and the composite color television signal are applied to the burst separator 51; the burst separator 51 is a gate type of circuit, which, responsive to the gate pulses 49, separates the color synchronizing bursts from the composite color television signal.

The separated bursts are thereupon applied to the burst synchronized signal source 53 which develops a reference signal which is continuous during at least each scanning line. Using, for example, an injection-lock type of oscillator, or a ringing circuit, or an oscillator working in conjunction with a reactance-tube automatic-frequency-control type of circuit, the reference signal is accurately synchronized to a phase prescribed by the bursts. The reference signal is thereupon applied to the phase shift circuit 55 which generates typically a plurality of demodulating signals having selected phases which are accurately maintained. In the color television receiver of Figure 3, the phase shift circuit 55 develops demodulating signals corresponding to the phases of the R—Y, B—Y and G—Y color difference signals whose phases are described by the vectors of Figure 1. The phases of the R—Y, B—Y and G—Y color difference signals are denoted on the drawing of Figure 3 as $\theta$ (R—Y); $\theta$ (B—Y); and $\theta$ (G—Y), respectively.

The composite color television signal is passed through, typically, the polarity inverter 57 which inverts the polarity of at least the luminance signal information. It is to be appreciated that whereas the chrominance signal is therefore also reversed in polarity, the expedient of properly phasing the demodulating signals in accordance with this polarity reversal, permits the extraction of the correct color difference signal information from the chrominance signal by a color converter. The output of the polarity inverter 57 is therefor termed a —Y+ chroma. The —Y+ chroma signal is thereupon applied simultaneously to the step filters 61, 63 and 65.

The step filter 61 applies an amplitude-adjusted composite color television signal to the color converter 71 for developing the blue component color signal, that is, the blue color converter 71. The phase shift circuit 55 also applies an R—Y phased demodulating signal to the blue color converter 71. The blue color converter, responsive to the applied signals, thereupon develops a blue component color information signal which is applied to a control electrode of the electron gun which controls the light emission of the blue phosphors of the color kinescope 45. Since, as is illustrated by vector diagram of Figure 1, the B—Y color difference signal has a relative amplitude level of 0.49 then the step filter 61, in the frequency range above 3 mcs., increases the amplitude of the chrominance signal frequency band according to the ratio of 100/49 or to 203% of the relative amplitude level of the lower frequency components of composite signals below 3 mcs. The output component color signal from the blue converter 71 is therefore correctly indicative of the saturation of the blue color in the televised image.

The step filter 63 applies a detected composite color television signal to the red color converter 73 wherein the chrominance signal frequency range above 3 mcs. in the applied composite signal is increased in relative amplitude level to 113%. This increase in relative amplitue level in the vicinity of the chrominance signal is in keeping with the fact that the relative amplitude level of the R—Y color difference signal in the chrominance signal is 0.877; an increase of 100/.877 is therefore required so that the red component color signal, applied by the red color converter to the red-phosphor controlling gun of the color kinescope 45, provides correct saturation for the red color of the televised image.

The step filter 65 applies an amplitude compensated composite color television signal to the green color converter 75. Since, according to the color difference signal amplitudes noted in Figure 1, the relative amplitude level of the green color difference signal in the chrominance signal is 1.44, it is necessary that the amplitude of the chrominance signal in the range from 3 to 4.2 mcs. in the composite color television signal be reduced according to the ratio of 100/1.44 or 69%; the step filter 65 therefor has the response characteristic curve 66 which reduces the amplitude level of the chrominance signal in the composite color television signal according to this ratio. The green color converter 75, responsive to the output signal of the step filter 65, develops a green component color signal which is thereupon applied to a corresponding control electrode of the color kinescope 45; this green component color signal properly describes the color saturation of the green information in the televised image.

The step filter 65 and the green color converter 75 are diagrammed in schematic form in Figure 3 to illustrate typical circuits, although they are not necessarily definitive or preferred circuits, to perform the functions prescribed.

The step filter 65 is, for example, a filter of the bridged-T type. This filter has a series inductance arm 77 which is center-tapped and which provides mutual coupling between the inductance winding on each side of the center-tap. A shunt arm, namely the capacitance 79, is connected from the center-tap of the inductance 77 to ground; a step-producing terminating resistor 80 is connected in shunt with capacitance 79. An adjustable resistance 81 is connected in series with the inductance 77. The bridge circuit consists of a condenser 83 in series with an adjustable resistor 85. The bridge is connected in shunt with the adjutable resistance 81 and the inductance 77. For general characteristics of bridged-T filters of the type employed for the step filter 65, see the present inventor's copending application entitled "Signal Filtering Systems" bearing the filing date December 31, 1953 and the U.S. Serial No. 401,586. Generally speaking, the inductance 77 and the shunt arm condenser 79 may be considered as providing principal transmission at the low frequencies with the condenser 83 of the bridge providing principal transmission at the higher frequencies. By adjusting the adjustable resistors 81 and 85 to proper values, appropriate attenuation can be introduced into both the bridge circuit and into the series and shunt arms circuit so that the step of the type illustrated by characteristic curve 66 may be provided. The cutoff frequency of the step filter 65 must, of course, be greater than the highest frequency in the frequency band of the composite color television, that is, around 4.2 mcs. It is to be noted that bridged-T filters of the type illustrating the step filter 65 can also be employed for use as the step filters 61 and 63. The required steps in the transmission characteristics may be achieved by suitable adjustments of adjustable resistors corresponding to the adjustable resistors 81 and 85.

The green color converter 75 uses, typically, a pentode 91. The output of the step filter 65 is applied to the first control grid of this pentode 91. A G—Y phased demodulating signal from the phase shift circuit 55 is applied to the third control grid of the pentode 91. The luminance signal portion of the composite color television signal is inverted in polarity and developed across the output load resistance 93. Interaction between the chrominance signal portion of the composite color television signal and the G—Y phased demodulating signal in the electron stream of pentode 91 will also develop the G—Y color difference signal across the output load resistance 93; addition of the luminance signal and the G—Y color difference signal will be thereupon produced across the output load resistance 93 to develop the green component color signal at the anode terminal 95. In order to eliminate signal frequencies in the color subcarrier range from the green component color signal, thereby preventing dot structure and dot crawl on the face of the color kinescope, a series resonant circuit 97 which is series resonant at 3.58 mcs., is coupled between the anode of pentode 91 and ground.

Having described the invention, what is claimed is:

1. In a color television receiver including a source of a composite video signal comprising a luminance signal occupying a predetermined band of video frequencies and a chrominance signal occupying a predetermined portion of said video frequency band, said chrominance signal comprising a phase and amplitude modulated subcarrier, the combination comprising first and second color demodulators, respective means for applying said composite video signal from said source to said first and second color demodulators, one of said signal applying means having a pass band encompassing said video frequency band and and having a frequency response characteristic shaped such as to provide a reduced level of response for signal frequencies in at least a major segment of said predetermined band portion relative to the level of response for signal frequencies in the remainder of said band, the other of said signal applying means also having a pass band encompassing said video frequency band but having a frequency response characteristic shaped such as to provide an increased level of response for signal frequencies in at least a major segment of said predetermined band portion relative to the level of response for signal frequencies in the remainder of said band, means for applying respective demodulating signals, each of subcarrier frequency but of respectively different phase, to said first and second demodulators to cause the development in the respective outputs of said first and second demodulators of respectively different component color signals, a color image reproducer, and means for applying the respective component color signal outputs of said first and second demodulators to said color reproducing device, each of said last named signal applying means having a pass band encompassing signal frequencies within said predetermined band portion as well as signal frequencies in the remainder of said band.

2. Apparatus in accordance with claim 1 also including a third color demodulator, additional means for applying said composite video signal from said source to said third color demodulator, said additional signal applying means having a pass band encompassing said video frequency band and having a frequency response characteristic shaped such as to provide an increased level of response for signal frequencies in at least a major segment of said predetermined band portion relative to the level of response for signal frequencies in the remainder of said band, means for applying a demodulating signal of subcarrier frequency, but differing in phase from said first-named demodulating signals, to said third demodulator to cause the development in the output of said third demodulator of a third component color signal differing from said first-named component color signals, and further means for applying the third component color signal output of said third modulator to said color reproducing device, said further signal applying means having a pass band encompassing signal frequencies within said predetermined band portion as well as signal frequencies in the remainder of said band, said color image reproducing device serving to reproduce color images solely in response to the component color signal outputs of said first, second and third demodulators.

References Cited in the file of this patent

UNITED STATES PATENTS

| | | |
|---|---|---|
| 2,717,276 | Schroeder | Sept. 6, 1955 |
| 2,773,929 | Loughlin | Dec. 11, 1956 |

FOREIGN PATENTS

| | | |
|---|---|---|
| 689,356 | Great Britain | Mar. 25, 1953 |
| 762,060 | Great Britain | Nov. 21, 1956 |